United States Patent
Vandamme et al.

(10) Patent No.: US 12,247,732 B2
(45) Date of Patent: Mar. 11, 2025

(54) STEAM BOILER LIQUID SEPARATOR AND METHOD FOR THE PRODUCTION THEREOF

(71) Applicant: Westinghouse Electric Germany GmbH, Mannheim (DE)

(72) Inventors: Francois Vandamme, Ecaussinnes (BE); Albertus Kroes, Baulers (BE)

(73) Assignee: Westinghouse Electric Germany GmbH, Mannheim (DE)

( * ) Notice: Subject to any disclaimer, the term of this patent is extended or adjusted under 35 U.S.C. 154(b) by 533 days.

(21) Appl. No.: 17/642,980

(22) PCT Filed: Sep. 7, 2020

(86) PCT No.: PCT/EP2020/000152
§ 371 (c)(1),
(2) Date: Mar. 15, 2022

(87) PCT Pub. No.: WO2021/052616
PCT Pub. Date: Mar. 25, 2021

(65) Prior Publication Data
US 2022/0333769 A1    Oct. 20, 2022

(30) Foreign Application Priority Data
Sep. 17, 2019   (DE) .......................... 102019006567.0

(51) Int. Cl.
| F22B 37/32 | (2006.01) |
| B01D 45/16 | (2006.01) |
| B04C 3/00  | (2006.01) |
| F22B 1/16  | (2006.01) |
| F22B 37/26 | (2006.01) |

(52) U.S. Cl.
CPC ............ *F22B 37/327* (2013.01); *B01D 45/16* (2013.01); *B04C 3/00* (2013.01); *B04C 2003/006* (2013.01); *F22B 1/162* (2013.01); *F22B 37/268* (2013.01)

(58) Field of Classification Search
CPC ...... F22B 1/162; F22B 37/268; F22B 37/327; B01D 45/16; B04C 2003/006; B04C 3/00
USPC .......................................................... 122/34
See application file for complete search history.

(56) References Cited

U.S. PATENT DOCUMENTS 4,629,481 A    12/1986   Echols
5,564,370 A *  10/1996   Giraud ..................... B04C 3/04
                                                   122/491

(Continued)

FOREIGN PATENT DOCUMENTS

KR         102013074 B1 *   8/2019

OTHER PUBLICATIONS

KR 102013074 B1—Translation (Year: 2019).*

(Continued)

*Primary Examiner* — Steven B McAllister
*Assistant Examiner* — Benjamin W Johnson
(74) *Attorney, Agent, or Firm* — Paul Katterle

(57) ABSTRACT

A steam boiler liquid separator having a plurality of liquid separator segments connected together to form a shaft disposed inside a pipe section, with swirl vanes disposed around the shaft. The liquid separator segments each include a shaft segment connected to a pipe segment by a swirl vane such that the shaft segment is disposed radially inward from the pipe segment.

14 Claims, 3 Drawing Sheets

(56) References Cited

U.S. PATENT DOCUMENTS

| 2003/0019363 A1* | 1/2003 | Grover | H01M 8/04291 |
| | | | 429/444 |
| 2007/0201604 A1* | 8/2007 | Chaki | B04C 3/00 |
| | | | 376/301 |
| 2015/0206606 A1 | 7/2015 | Ellison | |

OTHER PUBLICATIONS

International Search Report for PCT/EP2020/000152, dated Dec. 18, 2020.
International Preliminary Report on Patentability for PCT/EP2020/000152.

* cited by examiner

STEAM BOILER LIQUID SEPARATOR AND METHOD FOR THE PRODUCTION THEREOF

CROSS-REFERENCE TO RELATED APPLICATION(S)

This application is the U.S. national phase of PCT Application No. PCT/EP2020/000152 filed on 7 Sep. 2020, which claims priority to German Patent Application No. 10 2019 006 567.0 filed on 17 Sep. 2019, the disclosures of which are incorporated in their entirety by reference herein.

TECHNICAL FIELD

The disclosure relates to a steam boiler liquid separator for a steam boiler through which a cooling medium flows vertically, wherein a number of swirl vanes are arranged about a shaft in a pipe section, wherein each swirl vane is connected to the shaft and the pipe section, wherein the swirl vanes are shaped such that a rotational movement is imparted to a flow of steam through the pipe section in addition to its longitudinal movement through the pipe section. The disclosure also relates to a method for producing a steam boiler liquid separator.

BACKGROUND

Liquid separators find industrial use in many different designs. In a design which is used in particular in steam boilers, for example in the process industry, the chemical industry, or in nuclear power plants, for different liquids, cooling medium here flows through it vertically, viewed in a geodetic direction. Whilst the cooling medium flows into the steam boiler from below, it is usually still entirely in a liquid state of aggregation. In the course of the absorption of heat from the cooling medium, the latter is gradually converted to steam. In a zone in which the cooling medium should then be converted entirely to a vaporous state of aggregation, it can nevertheless occur that the steam still carries some liquid or droplets of liquid in it. The latter are then removed from the steam by liquid separators such that the quality of the steam as a whole is improved.

It is generally known that, in certain nuclear power plants, water is heated by a nuclear fuel and is recirculated in a first circuit, the so-called primary circuit. A plurality of steam boilers, through which, on the one hand, water of the primary circuit and, on the other hand, a cooling medium (usually also water) flows and thus cools the primary circuit, are generally used in a parallel arrangement as a heat sink in the primary circuit. Such heat exchangers are often arranged vertically, i.e. the water of the secondary or cooling circuit flows, viewed in a geodetic direction of its set-up, from below initially into a first zone of the steam boiler which is limited by a pipe base. This pipe base is connected to a second pipe base by a plurality of vertically arranged pipes such that the water flows from the first zone into the pipes in the direction of a second zone in the steam boiler. Water of the primary circuit flows around the plurality of pipes and in this way heats the cooling medium (water) of the secondary circuit. The steam boiler is here designed such that the water in the region of the pipes changes into the vapor phase and thus passes as steam into the second zone of the heat exchanger.

It can occur here that the water of the secondary circuit does not entirely change into the vapor state and instead passes as wet steam into the second zone of the steam boiler, i.e. a heat exchanger. In order to improve the quality of the steam, it is desired that as far as possible the steam contains no water when it leaves the steam boiler and is usually conveyed to a steam turbine. This improvement in quality is achieved, for example, by a liquid separator, namely a water separator, being arranged in the second zone. A so-called cyclone separator, which works by centrifugal force and can also be configured with multiple stages, is often chosen as the design.

In the case of a steam boiler for nuclear power plants which is arranged vertically, a two-stage model of water separator is provided which is arranged in the upper zone of the steam boiler between an upper pipe base and the upper outlet, namely the steam outlet of the steam boiler or heat exchanger.

The second stage of the two-stage water separator has a number of vertically arranged pipes which have a diameter which is large enough to accommodate a first stage of the water separator which is itself in turn a liquid separator or water separator. The first stage of the water separator here has a plurality of curved vanes which are welded into the pipes. The vanes force the steam flowing through the pipes into a helical flow, i.e. a flow with a flow component in the longitudinal direction of the pipes and a rotating flow component, i.e. a flow component which is rotated about a notional center axis of a pipe. The flow has the effect that the centrifugal forces then acting on the water droplets contained in the steam or the water that is contained force the droplets or the water to the edge of the pipes and they or it is fed back in the second stage to the zone with liquid cooling medium, namely water. For this purpose, perforated vanes which allow the water to pass through the holes whereas the steam remains in the steam boiler dome, are arranged, for example, above the first stage. Alternatively, for this purpose, concentric pipes, in which the water collects and is then fed back into the zone with liquid cooling medium, namely water, are arranged above the first stage. In this way, the water content of the remaining steam is removed and the steam quality is increased.

As part of the operation of the steam boiler, the curved vanes, which are usually made from carbon steel (black steel), over time are subject inter alia to wear owing to so-called flow-assisted corrosion or flow-accelerated corrosion (FAC) such that the vanes become thinner in at least certain zones or locations, i.e. are eroded. When a specified wear state is reached, the vanes then generally need to be replaced as part of on-site repair or maintenance work on the steam boiler. To do this, it is normal practise today for workers to enter the relevant zone of the steam boiler through a manhole, to cut out, detach, or saw out the worn vanes from the pipes, for example using a separation process. New curved vanes are then affixed to the intended location on the pipe wall of the first stage of the water separator, initially with spot welds, and may be oriented repeatedly until the desired shape and position of the vanes has been reached, and then connected firmly to the pipe wall by a weld seam.

A disadvantage of the prior art is that it takes a relatively long time to make this replacement. In addition, it is difficult to weld the new vanes in the precisely correct geometrical position such that the curved vanes can achieve their maximum physical water separation effect. There is also a risk of deformation of the vanes when the vanes are welded freehand to the pipe wall with a weld seam.

SUMMARY

Starting from this prior art, the object of the disclosure is to provide a steam boiler liquid separator which can be produced relatively quickly and additionally has a low risk of deformation during production. The object is also to provide a method for producing a steam boiler liquid separator.

The object is achieved by a steam boiler water separator for a steam boiler through which steam flows vertically, wherein a number of swirl vanes are arranged about a shaft in a pipe section, wherein each swirl vane is connected to the shaft and the pipe section, wherein the swirl vanes are shaped such that a rotational movement is imparted to a flow of steam through the pipe section in addition to its longitudinal movement through the pipe section. The steam boiler water separator is characterized in that the pipe section has a plurality of pipe segments, in that the shaft has a plurality of shaft segments, in that each swirl vane is connected to a pipe segment and to a shaft segment to form a water separator segment, in that the shaft segments are connected positively and detachably to a shaft segment holder, and in that they are held in their structurally intended position by the positive connection.

BRIEF DESCRIPTION OF THE DRAWINGS

The disclosure, further embodiments, and further advantages will be described in detail with the aid of the exemplary embodiments illustrated in the drawings, in which.

DETAILED DESCRIPTION OF ILLUSTRATIVE EMBODIMENTS

Figure 1:
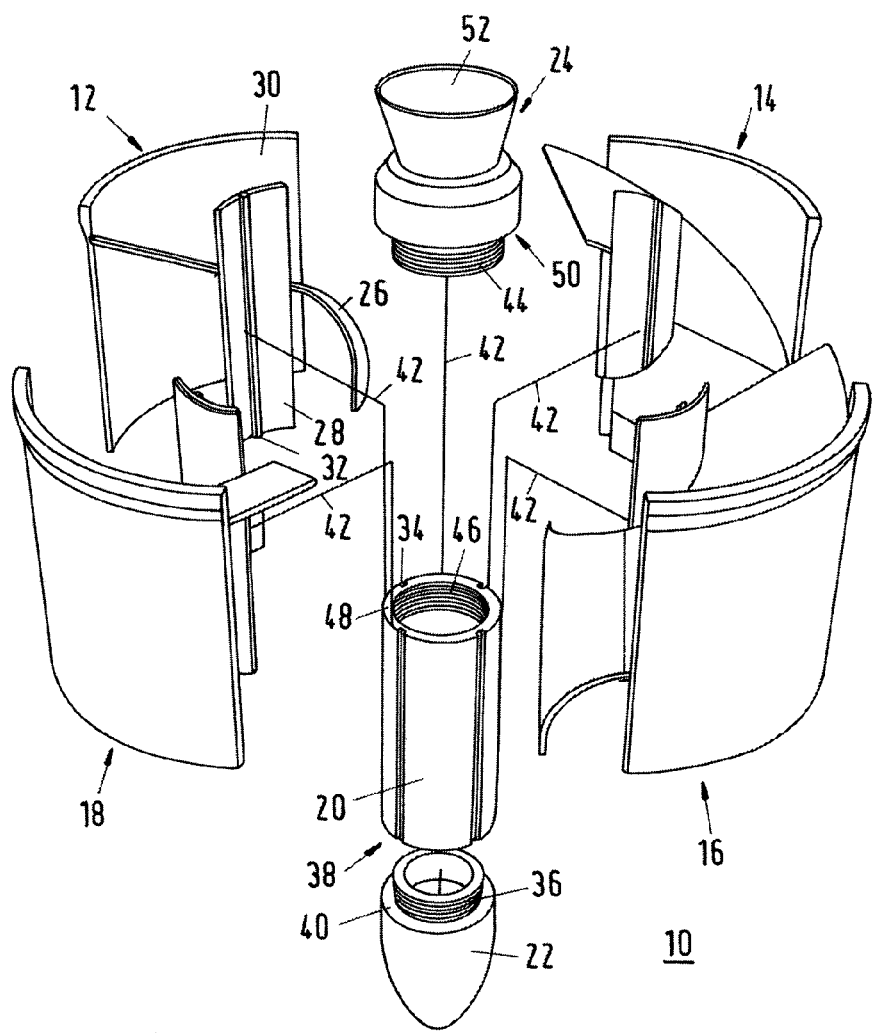
FIG. 1 shows an exploded drawing of an exemplary embodiment of a water separator.

The basic concept of the disclosure is that the swirl vanes are no longer attached, as before, to an existing pipe wall, which has the abovementioned disadvantages. Each swirl vane is now already connected to a pipe segment and to a shaft segment. When the shaft segments are then attached to their shaft segment holder, the pipe segments join together to form the pipe section. As a result, the time-consuming positioning and fixing, for example by affixing the swirl vanes to the pipe section, is advantageously avoided. It is then particularly advantageous if the steam boiler water separator is produced on site and not in a workshop. It is very particularly advantageous if the steam boiler water separator is produced as it were in situ, in other words when a liquid separator or a water separator needs to be replaced in a steam boiler and a new liquid separator replaces the worn old one. The steam boiler water separator is usually then not placed in the steam boiler as a complete unit because the dimensions of a steam boiler water separator are usually too large for access to a dome of the steam boiler, for example access through a manhole. A swirl vane with a pipe segment already attached thereto and a shaft segment attached thereto is dimensioned such that it fits through a manhole of the relevant steam boiler. In the dome inside the steam boiler, the individual swirl vanes are connected positively and detachably with their shaft segments to the shaft segment holder. A pipe section is thus also formed from the pipe segments. A steam boiler water separator is thus produced particularly simply which is already positioned in a pipe section. The production time for a steam boiler water separator is accordingly considerably reduced. In addition, the manual positioning of the swirl vanes on the pipe wall is avoided such that quality-impairing deformation is avoided by the in-situ welding of the swirl vanes to a pipe wall in the steam boiler.

The steam boiler water separator is particularly advantageously used when it is replaced as a replacement steam boiler water separator in an environment which is hazardous to people, for example in a nuclear power plant steam boiler. People should only spend a limited amount of time there such that the steam boiler water separator, i.e. in this case a nuclear power plant steam boiler water separator, is produced as quickly as possible and replaced quickly.

A development of the steam boiler water separator provides that a first closure element is connected to a first end face of the shaft segment holder and a second closure element is connected to a second end face of the shaft segment holder, that each closure element has a circular groove with an open side facing the respective end face, that a respective radially outer groove wall of the grooves engages over a subzone of the shaft segments. It is hereby advantageous that the individual axial ends of the shaft segments of an end face are placed in a groove of a closure element. The axially outer groove wall thus engages over the axial ends. The axial ends are in this way protected particularly well from force exerted by the flow of steam through the steam boiler water separator. Wear is correspondingly minimized.

A particularly simple way of connecting the closure elements to the end faces is characterized in that the closure elements are screwed into the end face of the shaft segment holder. For this purpose, a closure element has, for example, an external thread which is screwed into a corresponding internal thread on the shaft segment holder.

A further alternative embodiment of the steam boiler water separator is characterized in that each shaft segment has a molding, in that the shaft segment holder has guide grooves which are arranged in the longitudinal direction of the shaft segment holder on the radially outer surface of the latter, and in that a positive connection is produced between each shaft segment and the shaft segment holder by a respective molding/guide groove combination. A particularly simple positive connection between the shaft segments and the shaft segment holder is possible in this way. Preferred positive-locking shapes are, for example, dovetail or mushroom-shaped grooves in the shaft segment holder with a correspondingly shaped molding on the shaft segments. It is also within the concept of the disclosure that the grooves or the moldings are also arranged on the respective other component in order to produce a molding/guide groove combination.

A further alternative embodiment of the steam boiler water separator provides that adjacent components of the components shaft segments, pipe segments, shaft segment holders, and/or closure elements are connected to one another undetachably in their position by securing means. Two adjacent components can be connected, in order to be secured in position or in order to be secured against the component coming loose from its position, by a large number of technical options, for example by spot welds, weld seams, adhesive bonding, bolts, or rivets. A particularly simple, time-saving, and at the same time secure securing option for use in a replacement situation or within a steam boiler is the placement of spot welds or weld seams which connect two adjacent components to each other.

The object is also achieved by a steam boiler through which steam flows vertically, with a primary water separator which is arranged in an upper dome zone, viewed geodetically, wherein the primary water separator has a number of vertically extending pipe sections, wherein a steam boiler water separator is arranged in at least some of the pipe sections. The steam boiler provides a specific installation situation for the steam boiler water separator, in particular in a nuclear power plant. This means that the steam boiler water separator is produced only within the confined space of the dome of the steam boiler. The abovedescribed advantages are accordingly particularly important when the steam boiler water separator is produced inside a steam boiler dome.

For particularly simple production of the steam boiler with a steam boiler water separator, it is provided that the dome zone has a manhole, that the dimensions and form of the components shaft segments, pipe segments, shaft segment holders, and/or closure elements are adapted to the clear width of the manhole such that these components can be introduced into the dome zone from outside the dome zone. In this way, a steam boiler water separator can be produced using just a few components prefabricated in a workshop with appropriate precision and be inserted into its intended installation location in the steam boiler.

A preferred alternative embodiment of the steam boiler is use as a nuclear power plant steam boiler.

The object is additionally achieved by a method for producing a steam boiler water separator according to the disclosure, comprising the following method steps:

Connecting the first closure element to the shaft segment holder

Positively connecting the shaft segments of the water separator segments to the shaft segment holder such that the pipe section is formed by the pipe segments and such that the swirl vanes are arranged at their structurally intended positions, Connecting the second closure element to the shaft segment holder such that the axial positions of the shaft segments between the first and the second closure element are fixed.

In this way, a steam boiler water separator is produced particularly simply and quickly with just a few method steps according to the disclosure. In particular in the case of in-situ production, i.e. production which does not take place in a workshop context, the method steps according to the disclosure ensure a high quality of a steam boiler water separator, whilst the swirl vanes additionally are subject to no risk, or just a small risk, of deformation of faulty positioning of the swirl vanes during production.

The method according to the disclosure for producing a steam boiler water separator can also comprise the following subsequent additional method step:

Attaching the securing means in each case to adjacent components of the components shaft segments, pipe segments, shaft segment holders, and/or closure elements.

In this alternative embodiment, the position and the connection of adjacent components are additionally ensured by the securing means.

Thus, in the method for producing a steam boiler water separator, the securing can be effected by respective adjacent components of the components shaft segments, pipe segments, shaft segment holders, and/or closure elements being connected to one another by spot welds or weld seams as the securing means.

A further alternative embodiment of the method for producing a steam boiler water separator in a dome zone of a steam boiler provides the following additional step:

Introducing the components shaft segments, pipe segments, shaft segment holders, and/or closure elements through the manhole into the dome zone.

The purpose of this alternative embodiment of the method is to produce a steam boiler water separator in a specific installation situation, which usually needs to be done as quickly as possible, wherein the quality of the steam boiler water separator cannot be impaired.

FIG. 1 shows an exploded drawing of a water separator 10 as an exemplary embodiment for a steam boiler liquid separator which is intended for installation as a replacement liquid separator in a primary steam boiler of a nuclear power plant. In the example chosen, the liquid medium which flows through the steam boiler is water which is heated during the flow through the steam boiler to form water vapor as steam. The water separator 10 shown has a first 12, a second 14, a third 16, and a fourth water separator segment 18 which all have the same structure. The water separator segments 12, 14, 16, 18 are arranged symmetrically about a holder with a center axis which lies longitudinally on a notional axis of symmetry of the water separator 10. The holder here has a shaft segment holder 20, a first closure element 22, and second closure element 24.

The structure of a water separator segment will be explained in detail below by way of example at a first water separator segment 12.

The first water separator segment 12 has a curved first swirl vane 26 to which a first shaft segment 28 is attached on its side facing the shaft segment holder 20. A first pipe segment 30 is connected to the first swirl vane 26 on the side facing away from the shaft segment holder 20. In the chosen exemplary embodiment, the water separator 10 has precisely four water separator segments which have the same structure with pipe segments 30, swirl vanes 26, and shaft segments 28. After assembly of the water separator 10, the four pipe segments 28 produce a complete pipe section. In the exemplary embodiment, each pipe segment 30 represents a quarter, or 90°, of the circumference of the pipe wall at the pipe section. In the chosen example, the shaft segments 28 also represent a quarter, or 90°, of the circumference and, when assembled, form a shaft pipe section. The first shaft segment 28 has, on its side facing the shaft segment holder 20, a dovetail molding 32 which is formed over the complete length of a longitudinal extent of the first shaft segment 28 of the first water separator segment 12. A total of four dovetail grooves, with dimensions which are adapted to the moldings on the shaft segments, are introduced into the shaft segment holder 20 over its longitudinal extent. Thus, for example, the first molding can be pushed longitudinally into a first groove and in this way connected positively to the shaft segment holder 20. The procedure of pushing the moldings into the grooves is indicated in this Figure in the form of a plurality of lines 42. The lengths of the shaft segment holder 20 and the shaft segments 28 are here matched to one another, i.e. have the same length in the chosen example.

In addition, the first closure element 22 has, on its end face facing the shaft segment holder 20, a thread 36 which can be screwed into a corresponding mating thread on a first end face 38 of the shaft segment holder 20. The mating thread cannot, however, be seen in this view. In addition, a circular groove 40 is incorporated on the first end face 38 into the material of the first closure element 22, wherein the clear width of the first circular groove 40 is adapted to the radial thickness of the material of the shaft segments. The region of the shaft segments which is arranged in the circular groove after assembly is positioned and fixed in this way. Another end face of the first closure element 22 is configured with a streamlined shape such that steam which occurs on the other end face is guided around the first closure element 22 and the holder as a whole with as minimal loss of pressure as possible.

In addition, the second closure element 24 has, on its end face facing the shaft segment holder 20, an external thread 44 which can be screwed into an internal thread 46 in a second end face 48 of the shaft segment holder 20. A second circular groove 50, which has a comparable configuration and function to the first circular groove 40, is introduced on this end face of the second closure element 24. Those regions of the shaft segments 28 which lie in the second circular groove 50 when assembled are also positioned and fixed there. A further end face of the second closure element 24 is configured as the diffusor element 52, which results in a further minimization of the loss of pressure in the flow of steam over the water separator 10.

The first 22 and the second closure element 24 fix all the water separator segments 12, 14, 16, 18 in a structurally predetermined axial and radial position at or on the shaft segment holder 20.

Figure 2:
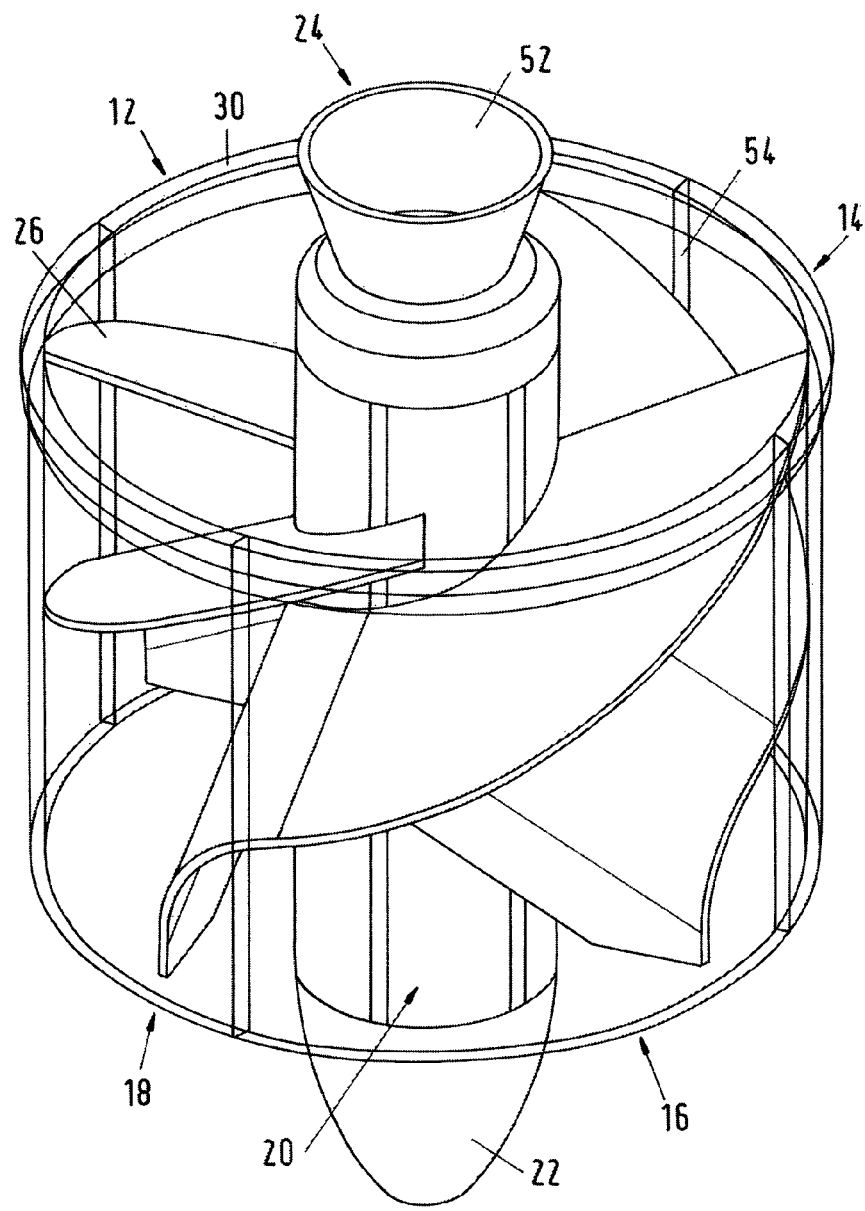
FIG. 2 shows a 3D drawing of the assembled water separator.

FIG. 2 shows a 3D view of the assembled water separator 10, for which reason the same reference numerals are used for the same components as in the description of FIG. 1. It can also be clearly seen in FIG. 2 that the pipe segments 30 of the individual water separator segments 12, 14, 16, 18 as a whole produce a pipe section in which the swirl vanes 26 are arranged. It can also be seen from the Figure that adjacent components, for example the first pipe segment 20 of the first water separator segment 12 and the adjacent pipe segment 30 of the second water separator segment 14, form a common joining surface 54 at which they lie flat against each other and at which the two components can be welded together by means of a weld seam as a securing means.

Figure 3:
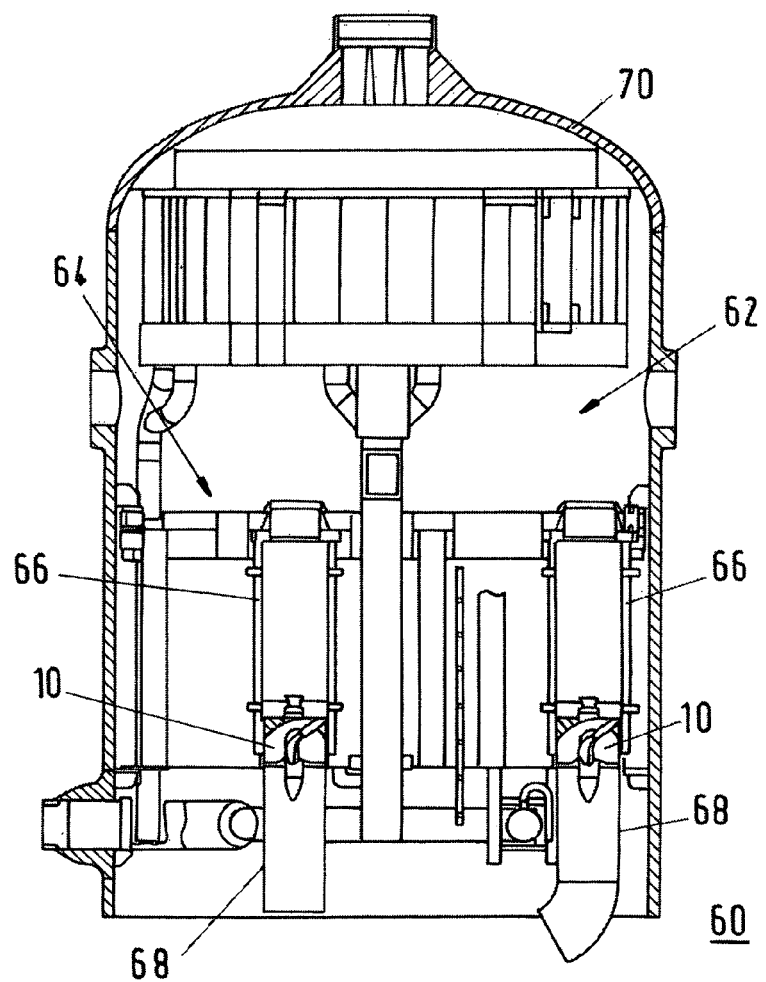
FIG. 3 shows a cross-section through a steam boiler with installed water separators.

FIG. 3 shows a cross-section through a geodetically upper part of a steam boiler 60 in the primary cooling circuit of a nuclear power plant with installed water separators 10. In the example shown, the steam boiler has a height of approximately 17 m and a diameter of approximately 4 m and a cooling medium, namely water, flows up through it from below. The cooling medium is heated and changes into the vapor phase as it flows through. Only an upper part of the steam boiler 60, a so-called dome, dome zone, or steam boiler dome 62, in which the cooling medium is already in the vapor phase, is shown in the Figure. A two-stage primary water separator 64, which has a plurality of vertically arranged first pipes 66 (two of which can be seen in the cross-section), is shown in the steam boiler dome 62. In each of the first pipes 66, a water separator 10 has been introduced as a steam boiler liquid separator according to the disclosure as the second stage of the two-stage primary water separator 64. To do this, an end face of an end of the pipe section of the water separator 10 is connected, for example welded, to an end face at the end of a second pipe 68. In addition, an external diameter of the second pipe 68 and the water separator 10 is smaller (800 millimeters in the example chosen but typically between 600 mm and 1100 mm) than a clear diameter of the first pipe 66. In this way, the second pipe 68 can, with the water separator 10 attached thereto, be pushed into the first pipe 66 from below and to be precise as far as a position in which the pipe section of the water separator 10 is situated entirely in the first pipe 66. The steam boiler dome 62 can be accessed, for example for repair or maintenance work, by incorporating a manhole (not shown in the Figure) into a steam boiler wall 70. The manhole is closed by a manhole cover while the steam boiler 60 is operating normally but can be opened temporarily for the said repair or maintenance work. A typical diameter for such a manhole is 500 mm to 600 mm.

Repair work which may be required on the steam boiler 60 consists of replacing the water separator or separators 10. After operation for a certain period of time, the material of the water separator can become worn or removed by the water separator being subjected to steam and water droplets such that the water separator can be destroyed or at least have limited functionality. It is, however, often not readily possible to replace the original water separator with a water separator 10 because an external diameter of the replacement water separator as the water separator 10 is larger than the clear diameter of the manhole through which the water separator 10 would have to pass into the steam boiler dome. The water separator 10 according to the disclosure is particularly suited to this use as a steam boiler liquid separator and is installed in the steam boiler 60 as follows. A more resistant material can here be chosen as the material for the water separator 10 than that of the original water separator, for example stainless steel or high-alloy special steels with a relatively high content of chrome, vanadium, or other metals. In addition, plating the components and in particular the swirl vanes 26 with, for example, austenitic steels can also be considered for increasing the resistance of the water separator 10 to wear. Plasma spray coating the components and in particular the swirl vanes 26 is also provided as a further alternative for increasing the resistance of the water separator 10 to wear.

It is assumed that the original water separator which needs to be removed from the steam boiler dome because of its state of wear, for example using a separation method such as sawing, flame-cutting, or grinding off the original water separator from the second pipe 68 and separating the original water separator from the first pipe 66. The original water separator is then broken down further such that the individual segments can be taken out of the steam boiler dome 62 through the manhole. The new water separator 10 can, however, not be introduced into the steam boiler dome 62 in an assembled state. This is because the diameter of the water separator 10 is larger than the clear width of the manhole. According to the disclosure, the water separator 10 has, however, a plurality of components. In the example shown, there are seven components which each have dimensions that allow them to be moved through the manhole. In this way, all the required components of the water separator 10 are first introduced into the steam boiler dome 62 through the manhole. In a first working step, the first closure element 22 is there first screwed into the mating thread of the shaft segment holder 20 with its thread 36. In a further working step, the first water separator segment 12 is inserted with its first molding 32 into the free end face of the first groove 34 and displaced in the first groove 34 until the first shaft segment 28 bears against a groove base of the circular groove 40. This working step is repeated for the second 14, the third 16, and the fourth water separator segment 18 until they are arranged in the further grooves 34, assigned thereto, or longitudinal grooves in the shaft segment holder 20 and are in this way connected positively to the latter. In an additional working step, the second closure element 24 is screwed into the internal thread 46 of the shaft segment holder 20 with its external thread 44 until a groove base of the second circular groove 40 is tensioned against the shaft segments 28. In this way, the individual shaft segments are held and tensioned fixedly at their structurally intended positions between the first 22 and the second closure element 24. In the example shown, in a subsequent working step all the adjacent components are welded to one another, i.e. connected to one another undetachably, by weld seams. The touching sides of the first 30 and second pipe section are thus, for example, connected by a weld seam, or alternatively the closure element 22 is welded to the first shaft segment 28 by a weld seam.

The invention claimed is:

1. A steam boiler liquid separator for a steam boiler through which steam flows vertically, comprising:
   a pipe section;
   a shaft in the pipe section;
   a shaft segment holder;
   a plurality of swirl vanes arranged about the shaft in the pipe section, wherein each swirl vane is connected to the pipe section, wherein the swirl vanes are shaped such that a rotational movement is imparted to a flow of steam through the pipe section in addition to a longitudinal movement through the pipe section;
   wherein the pipe section has a plurality of pipe segments and the shaft has a plurality of shaft segments;
   wherein each swirl vane is connected to a pipe segment and to a shaft segment to form a liquid separator segment;
   wherein the shaft segments are attached positively and detachably to the shaft segment holder by a positive connection; and
   wherein the shaft segments are held in position by the positive connection;
   wherein a first closure element is connected to a first end face of the shaft segment holder and a second closure element is connected to a second end face of the shaft segment holder;
   wherein the first and second closure elements have circular grooves with open sides facing the first and second end faces, respectively; and
   wherein radially extending groove walls of the circular grooves engage axial ends of the shaft segments.

2. The steam boiler liquid separator as claimed in claim 1, wherein the first and second closure elements are screwed into the first and second end faces of the shaft segment holder, respectively.

3. The steam boiler liquid separator as claimed in claim 1, wherein each shaft segment has a molding;
   wherein the shaft segment holder has a radially outer surface with guide grooves which are arranged in a longitudinal direction of the shaft segment holder; and
   wherein the moldings of the shaft segments are disposed in the guide grooves of the shaft segment holder, respectively, thereby connecting the shaft segments to the shaft segment holder.

4. The steam boiler liquid separator as claimed in claim 1, wherein adjacent ones of the shaft segments, pipe segments, shaft segment holder and first and second closure elements are secured to one another undetachably in their respective positions.

5. The steam boiler liquid separator as claimed in claim 1, wherein in each liquid separator segment, the shaft segment is connected to the pipe segment by the swirl vane such that the shaft segment is disposed radially inward from the pipe segment.

6. The steam boiler liquid separator as claimed in claim 5, wherein the shaft segments are arcuate and the pipe segments are arcuate.

7. The steam boiler liquid separator as claimed in claim 6, wherein the shaft segments are connected together to form the shaft and the pipe segments are connected together to form the pipe section, wherein both the shaft and the pipe section are cylindrical and wherein the shaft is coaxial with the pipe section.

8. A steam boiler through which steam flows vertically, the steam boiler having a primary water separator which is arranged in an upper steam boiler dome wherein the primary water separator has a plurality of vertically extending pipe sections, wherein a steam boiler liquid separator as claimed in claim 1 is arranged in one of the pipe sections.

9. The steam boiler as claimed in claim 8, wherein the steam boiler dome has a manhole; and
   wherein the dimensions and the form of the shaft segments, pipe segments, shaft segment holder, and closure elements are configured to fit through the manhole so as to be introduced into the steam boiler dome from the exterior thereof.

10. The steam boiler as claimed in claim 8, wherein the steam boiler is a primary steam boiler of a nuclear power plant.

11. A method for producing a steam boiler liquid separator, comprising:
    providing a plurality of liquid separator segments, wherein each liquid separator segment comprises a swirl vane connected to a pipe segment and to a shaft segment;
    providing a shaft segment holder;
    providing first and second closure elements;
    connecting the first closure element to the shaft segment holder;
    positively and detachably connecting the shaft segments of the liquid separator segments to the shaft segment holder such that the shaft segments are disposed adjacent to each other around a circumference of the shaft segment holder such that a pipe section is formed by the pipe segments and a shaft is formed by the shaft segments in the pipe section and such that the swirl vanes are arranged around the shaft in the pipe section and are shaped such that a rotational movement is imparted to a flow of steam through the pipe section in addition to a longitudinal movement through the pipe section; and
    connecting the second closure element to the shaft segment holder such that axial positions of the shaft segments between the first closure element and the second closure element are fixed.

12. The method for producing a steam boiler liquid separator as claimed in claim 11, further comprising:
    securing together adjacent ones of the shaft segments, pipe segments, shaft segment holder, and first and second closure elements.

13. The method for producing a steam boiler liquid separator as claimed in claim 12, wherein the securing together of adjacent ones of the shaft segments, pipe segments, shaft segment holder, and first and second closure elements is performed by spot welding or forming weld seams.

14. The method for producing a steam boiler liquid separator as claimed in claim 11, wherein the method is performed in a steam boiler dome, and further comprises:
    introducing the shaft segments, pipe segments, shaft segment holder and the first and second closure elements through a manhole into the steam boiler dome.

* * * * *